United States Patent
Liu et al.

(10) Patent No.: US 8,327,144 B2
(45) Date of Patent: Dec. 4, 2012

(54) AUTHENTICATION METHOD, SYSTEM, AND APPARATUS THEREOF FOR INTER-DOMAIN INFORMATION COMMUNICATION

(75) Inventors: Hsueh-Teng Liu, Taipei (CN); Chun-Wei Fang, Taipei (CN)

(73) Assignee: Panasonic Corporation, Osaka (JP)

( * ) Notice: Subject to any disclaimer, the term of this patent is extended or adjusted under 35 U.S.C. 154(b) by 970 days.

(21) Appl. No.: 12/376,841

(22) PCT Filed: Dec. 20, 2007

(86) PCT No.: PCT/JP2007/075222
§ 371 (c)(1),
(2), (4) Date: Feb. 9, 2009

(87) PCT Pub. No.: WO2008/075792
PCT Pub. Date: Jun. 26, 2008

(65) Prior Publication Data
US 2010/0153726 A1    Jun. 17, 2010

(30) Foreign Application Priority Data
Dec. 21, 2006   (CN) .......................... 2006 1 0168572

(51) Int. Cl.
*H04L 9/32*   (2006.01)

(52) U.S. Cl. ....................................... 713/171; 713/168
(58) Field of Classification Search .................. 713/153, 713/168, 171; 380/277; 726/2, 6, 10; 709/227, 709/228, 229
See application file for complete search history.

(56) References Cited

U.S. PATENT DOCUMENTS

| | | | |
|---|---|---|---|
| 6,792,534 B2 * | 9/2004 | Medvinsky | 713/171 |
| 6,839,761 B2 | 1/2005 | Kadyk et al. | |
| 6,996,716 B1 | 2/2006 | Hsu | |
| 7,536,463 B2 * | 5/2009 | Seo | 709/227 |

(Continued)

FOREIGN PATENT DOCUMENTS

| | | |
|---|---|---|
| GB | 2411086 A | 8/2005 |
| WO | 03/084123 A | 10/2003 |

OTHER PUBLICATIONS

Kemp et al., "SIPPROXY" [Online] Jul. 11, 2002, XP002474780, retrieved from the Internet: URL:http://web.archive.org/web/20020611181337/http://www.iana.org/assignments/svrloc-templates/sipproxy.1.0.en [retrieved on Apr. 2, 2008].

(Continued)

*Primary Examiner* — Samson Lemma
(74) *Attorney, Agent, or Firm* — Greenblum & Bernstein, P.L.C.

(57) ABSTRACT

The present invention provides an authentication method for inter-domain information communication applied to first and second domains. The method instructs a first electronic device belonging to the first domain to request, through an intermediary node device simultaneously registered in the first and second domains, to obtain a first key from a second key distribution center in the second domain for transmission to a second electronic device in the second domain, and instructs the second electronic device to request, through the intermediary node device, to obtain a second key from a first key distribution center in the first domain for transmission to the first electronic device. Therefore, the first and second electronic devices are instructed to generate a shared third key using the first and second keys to perform secure information communication authentication.

37 Claims, 12 Drawing Sheets

U.S. PATENT DOCUMENTS

| | | |
|---|---|---|
| 2003/0182553 A1* | 9/2003 | Medvinsky .................. 713/171 |
| 2004/0105433 A1 | 6/2004 | Seo |
| 2004/0187031 A1 | 9/2004 | Liddle |
| 2005/0108575 A1 | 5/2005 | Yung |

OTHER PUBLICATIONS

Camtepe, "Kerberos Based Security System for Session Initiation Protocol," Internet Citation [Online] 1996, XP002458264, Retrieved from the Internet: URL:http://www.cs.rpi.edu/camtes/papers/Camtepe_msthesis_2001.pdf [retrieved on Nov. 13, 2007].

"Digital Broadband Cable Access to the Public Telecommunications Network; IP Multimedia Time Critical Services; Part II: Security; ETSI TS 101 909-11," ETSI Standards, European Telecommunications Standards Institute, Sophia-Antipo, FR, vol. AT-Digital, No. V122, Nov. 2003, XP002474781, pp. 66-69 and 110-114.

* cited by examiner

Fig.8

| CANDIDATE RELAY NODE DEVICE | HARDWARE CAPABILITY | MAXIMUM NUMBER OF SERVICES | NUMBER OF PRESENT SERVICES |
|---|---|---|---|
| Caro11@sipa.com | Pentium 4 (1GHz) | 5 | 0 |
| Caro12@sipa.com | Pentium 4 (2GHz) | 2 | 1 |
| Caro13@sipa.com | Pentium 4 (3GHz) | 5 | 5 |

Fig.9

| CANDIDATE INTERMEDIARY NODE DEVICE | HARDWARE CAPABILITY | MAXIMUM NUMBER OF SERVICES | NUMBER OF PRESENT SERVICES |
|---|---|---|---|
| Caro11@sipa.com | Pentium 4 (1GHz) | 5 | 0 |
| Caro12@sipa.com | Pentium 4 (2GHz) | 2 | 1 |

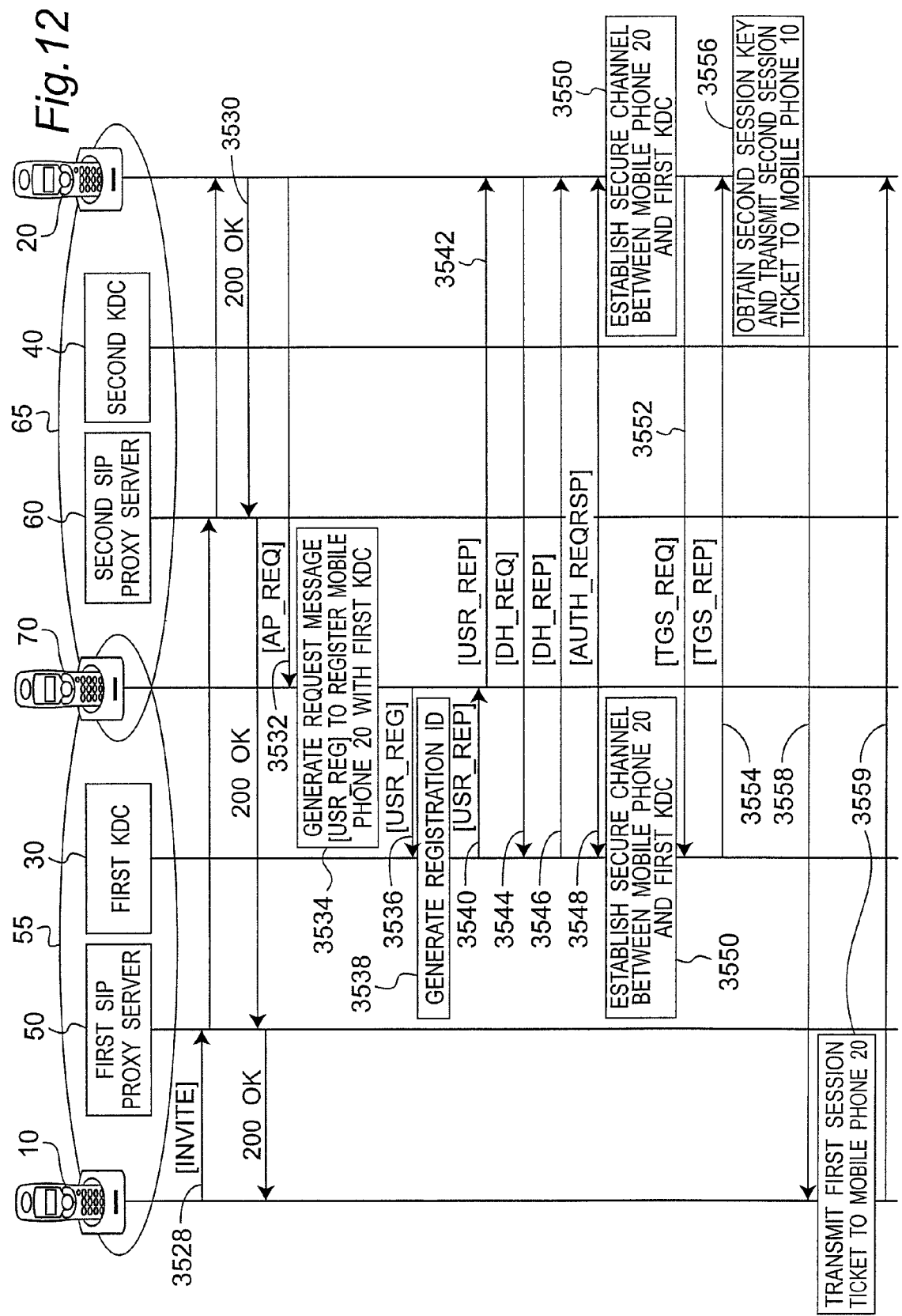

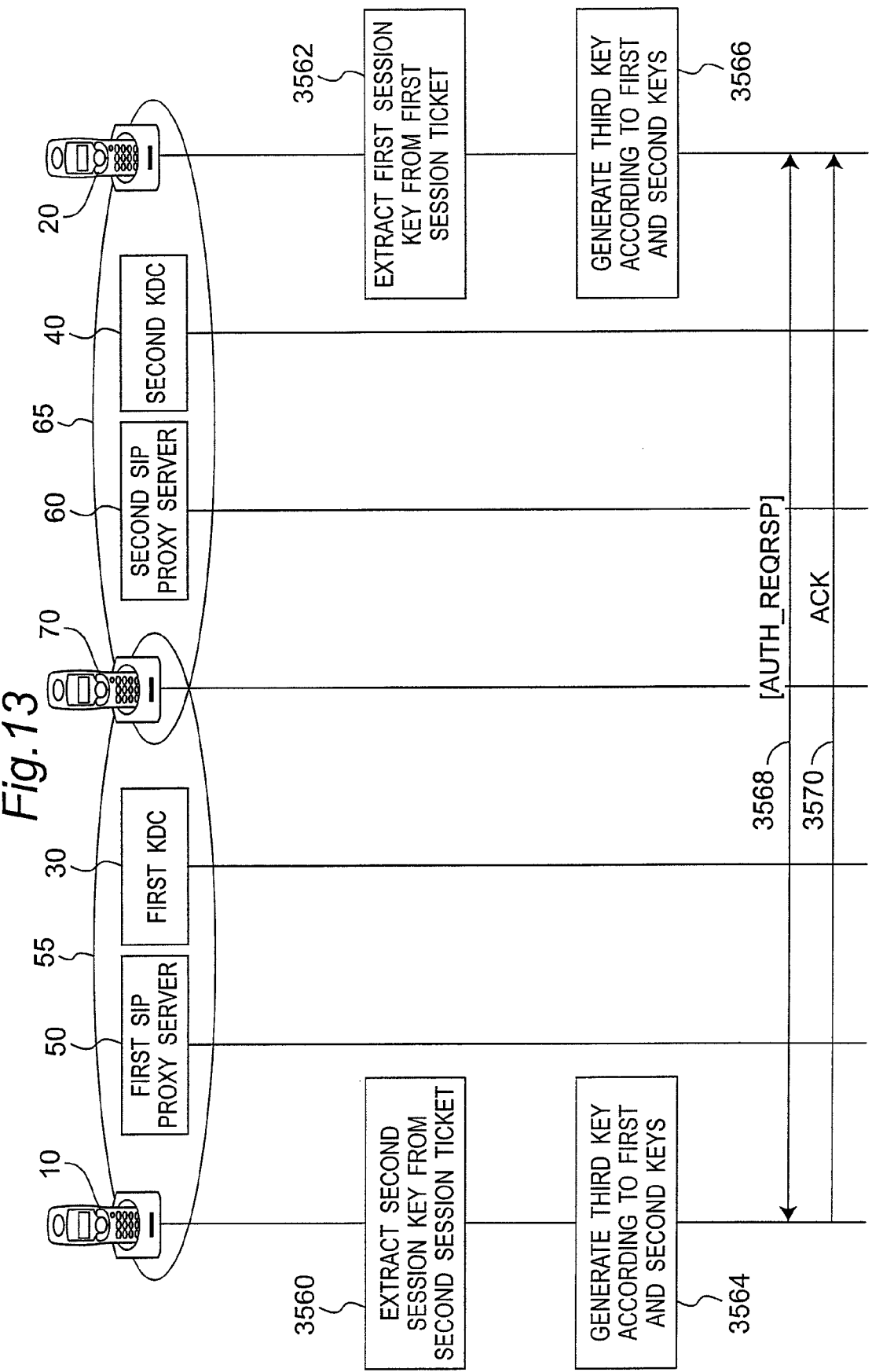

AUTHENTICATION METHOD, SYSTEM, AND APPARATUS THEREOF FOR INTER-DOMAIN INFORMATION COMMUNICATION

TECHNICAL FIELD

The present invention relates to an authentication method for information communication, and more particularly to an authentication method, system, and apparatus thereof for inter-domain information communication.

BACKGROUND ART

Network communication technologies have been quickly maturing in recent years. As a result, Voice over Internet Protocol (VoIP) in which digital voice packets are transmitted via the Internet, short message service (SMS) for transmitting messages, video communication, and multimedia streaming are presently being used to a great extent on the Internet.

For VoIP, Session Initiation Protocol (SIP) is, at present, the typical signaling protocol standard. In a VoIP system, each SIP-based mobile phone registers with a specific SIP domain registrar and belongs to a specific SIP domain, where security management of the domain is usually controlled by a key management center (KMC) or key distribution center (KDC). Since these mobile phones use the same authentication protocol, mutual authentication can be easily realized between mobile phones and the server, and among mobile phones in the same domain to achieve a secure communication link.

However, when the communication link between two mobile phones spans different domains, it is necessary to use another common authentication method in order to realize the secure communication because each domain may use a different authentication protocol. Consequently, the problem of inter-domain trust operations arises.

In order to solve the above problem, U.S. Pat. No. 6,839,761, entitled "Method and System For Authentication Through Multiple Proxy Servers That Require Different Authentication Data," allowed a SIP request to append respective authentication data for successive proxies (servers) so as to solve the problem of authentication between a client and successive proxies in SIP, thereby realizing successive authentication validation for different security domains. However, this patent is not directed to solving inter-domain problems.

Another US Patent Application Publication No. 20050108575, entitled "Apparatus, System and Method For Facilitating Authenticated Communication Between Authentication Realms," disclosed an authentication gateway to realize authentication among different authentication protocols. However, a fixed authentication gateway easily encounters the problem of service availability as a result of being subjected to network attacks.

Therefore, there exists a need for providing a mechanism capable of enabling electronic devices involved in communication spanning different security domains to acquire credentials for mutual authentication without requiring the use of complicated inter-domain trust operations on both security domain servers.

DISCLOSURE OF INVENTION

Therefore, the object of this invention is to provide an authentication method, system, and apparatus thereof for inter-domain information communication, in which credentials for mutual authentication may be acquired without requiring the use of complicated inter-domain trust operations on two security domain servers.

The authentication method of the present invention for inter-domain information communication is applied to a first electronic device belonging to a first domain and a second electronic device belonging to a second domain that desire to perform information communication via the Internet. The method comprises: (A) instructing the first electronic device to request a first proxy server in the same domain to find an intermediary node device that is simultaneously registered in the first and second domains; (B) instructing the first electronic device, through the intermediary node device, to register with a second key distribution center in the second domain so as to obtain a first key, and to transmit a first ticket containing the first key to the second electronic device; (C) instructing the second electronic device to receive the first ticket, and then, through the intermediary node device, to register with a first key distribution center in the first domain so as to obtain a second key, and to transmit a second ticket containing the second key to the first electronic device; and (D) instructing the first and second electronic devices to generate a shared third key according to the received first and second keys so as to perform information communication authentication.

In addition, an inter-domain information communication authentication system of the present invention for carrying out the aforementioned method is installed in a first domain and is used to perform information communication via the Internet with a second electronic device belonging to a second domain. The system comprises: a first proxy server for recording a plurality of candidate intermediary node devices; a first electronic device for sending a request message for requesting the first proxy server to find from the candidate intermediary node devices an intermediary node device that is simultaneously registered in the first and second domains, and through the intermediary node device, registering with a second key distribution center in the second domain so as to obtain a first key, and transmitting a first ticket containing the first key to the second electronic device; and a first key distribution center for providing registration to the second electronic device through the intermediary node device so as to obtain a second key, and transmitting a second ticket containing the second key to the first electronic device, such that the first electronic device and the second electronic device can generate a shared third key according to the received first and second keys so as to perform information communication authentication.

Furthermore, a mobile communication electronic device of the present invention for carrying out the aforementioned method belongs to a first domain and performs information communication with a second electronic device belonging to a second domain through the Internet. The mobile communication electronic device comprises: an intermediary node requesting module for sending a request message that requests a first proxy server in the same domain to find an intermediary node device that is simultaneously registered in the first and second domains; and an inter-domain key-processing unit for registering with a second key distribution center in the second domain through the intermediary node device so as to obtain a first key, transmitting a first ticket containing the first key to the second electronic device so as to request the same to reply with a second ticket containing a second key, processing the second ticket so as to obtain the second key, and generating a third key according to the first and second keys for use in performing information communication authentication with the second electronic device.

Additionally, an intermediary node device of the present invention for carrying out the aforementioned method is capable of spanning a first domain and a second domain, and communicating with a first proxy server and a first electronic device in the first domain, so as to assist the first electronic device in performing information communication with a second electronic device belonging to the second domain. The intermediary node device comprises: a domain information storing unit for storing configuration data; a first connection unit connected to the first proxy server; and a domain-specific information composing unit for generating domain-specific information according to the configuration data stored in the domain information storing unit, and transmitting the domain-specific information to the first proxy server through the first connection unit.

BRIEF DESCRIPTION OF DRAWINGS

Other features and advantages of the present invention will become apparent in the following detailed description of the preferred embodiment with reference to the accompanying drawings, of which:

FIG. 8 is a schematic diagram of a query result according to the preferred embodiment;

FIG. 9 is a schematic diagram of an initial filtering result of candidate intermediary node devices according to the preferred embodiment;

FIG. 12 is a flow chart of requesting a second key from a first KDC by a mobile phone belonging to a second domain through the intermediary node device according to the preferred embodiment; and FIG. 13 is a flow chart of generating a shared third key by mobile phones belonging respectively to the first and second domains using the obtained first and second keys to perform inter-domain authentication.

BEST MODE FOR CARRYING OUT THE INVENTION

Figure 1:
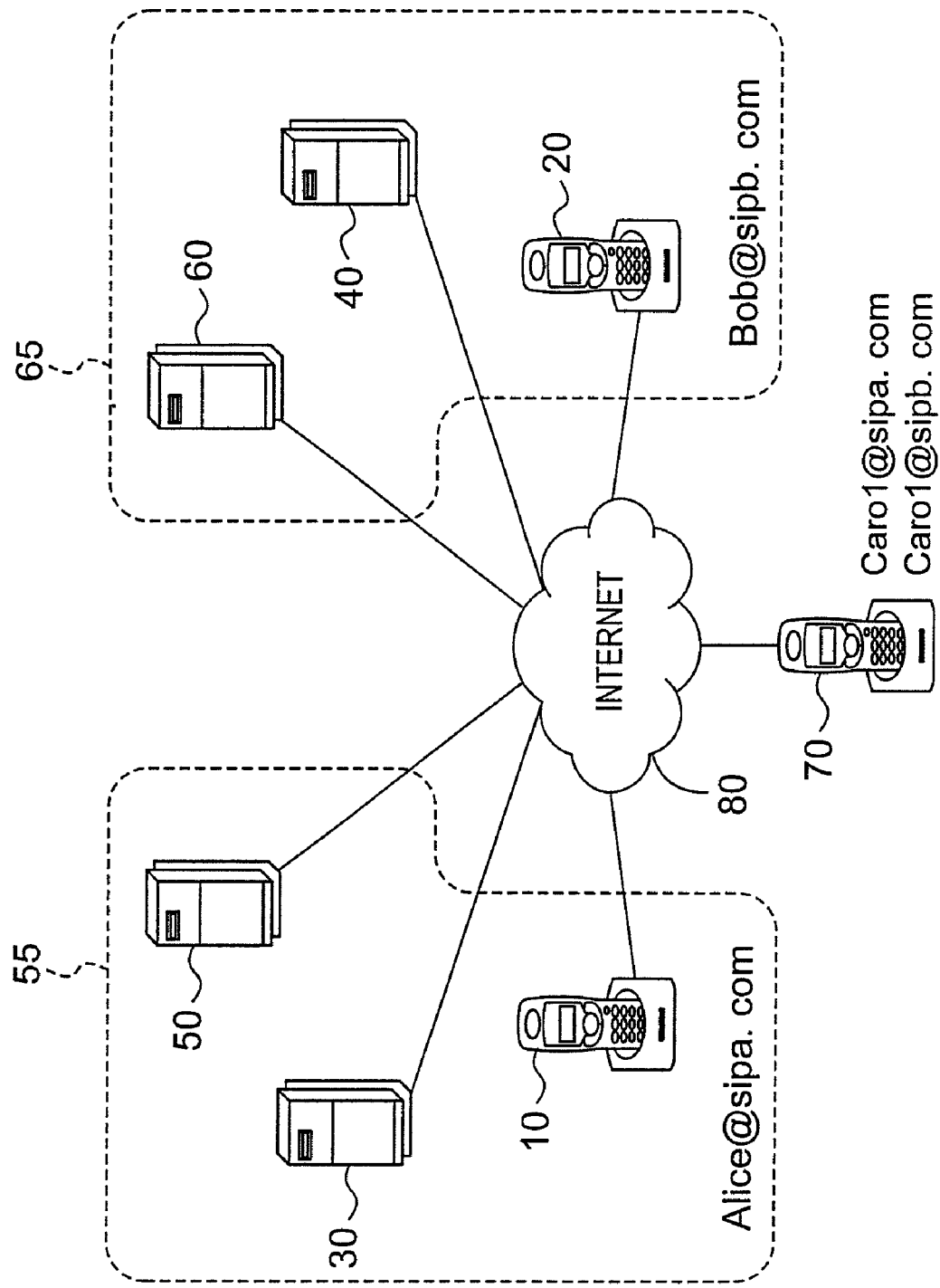
FIG. 1 shows a networking system architecture according to a preferred embodiment of an authentication method for inter-domain information communication of the present invention.

Referring to FIG. 1, the preferred embodiment of an authentication method for inter-domain information communication according to the present invention is applied to a first electronic device 10 (with SIP URI Alice@sipa.com) belonging to a first SIP domain 55 (with SIP URI sipa.com) and a second electronic device 20 (with SIP URI Bob@sipb.com) belonging to a second SIP domain 65 (with SIP URI sipb.com) through which voice data communication (i.e., VoIP) via the Internet 80 is desired. In the first domain 55, there is a first proxy server (in the preferred embodiment, the first proxy server is an SIP proxy server, hereafter referred to as the first SIP proxy server 50), and a first KDC 30. In the second domain 65, there is a second proxy server (in the preferred embodiment, the second proxy server is an SIP proxy server, hereafter referred to as the second SIP proxy server 60), and a second KDC 40. The first electronic device 10 is a call-requesting terminal, and the second electronic device 20 is a call-receiving terminal. In the preferred embodiment, the first and second electronic devices 10, 20 are exemplified as mobile phones (both described as mobile phones 10, 20 in the following), but are not limited in this respect.

Figure 2:
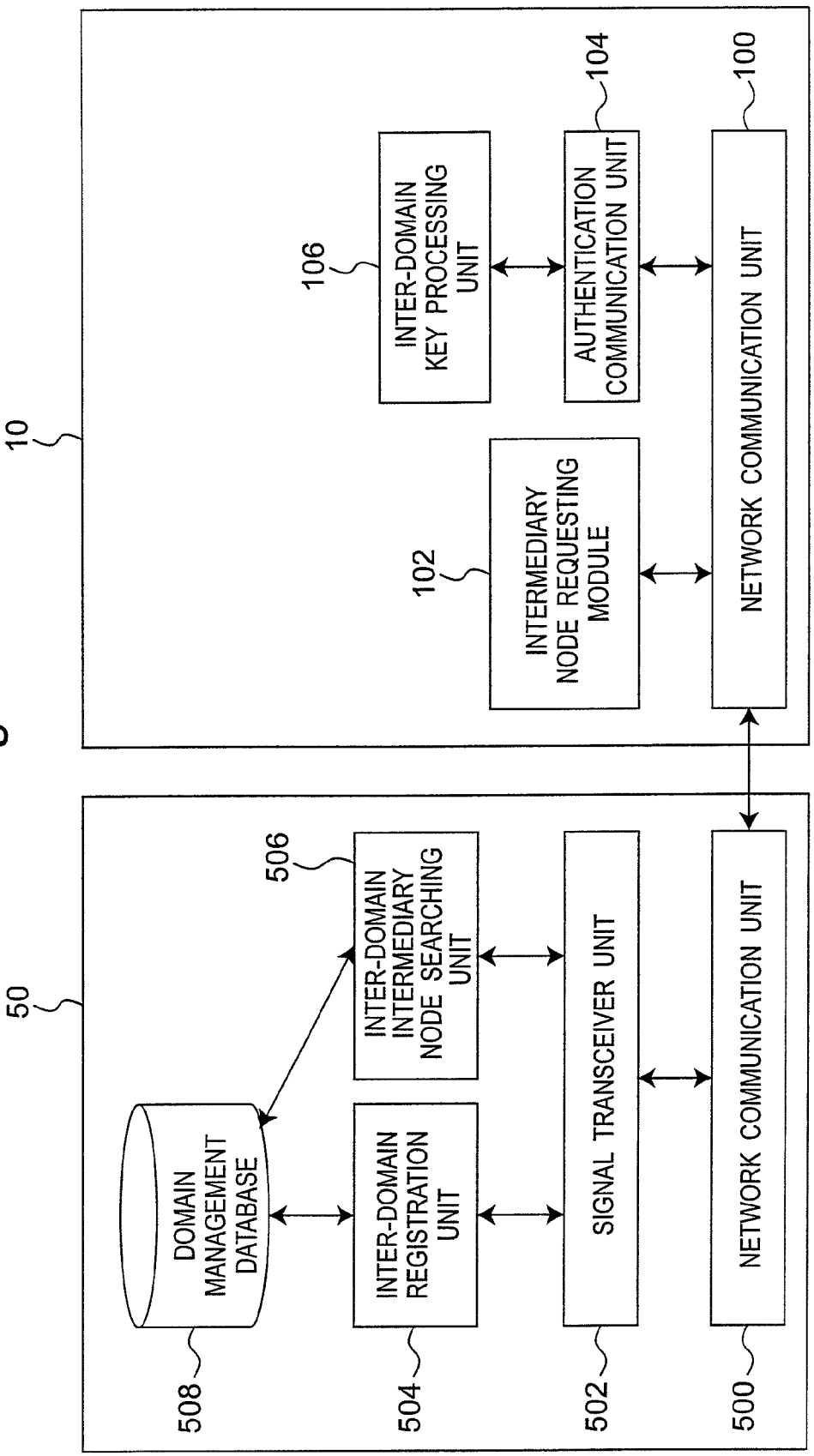
FIG. 2 is a block diagram of internal functional units of a first SIP proxy server and a mobile phone according to the preferred embodiment.

As shown in FIG. 2, which is a block diagram of internal functional units of the first SIP proxy server 50 and the mobile phone 10 according to the preferred embodiment, the first SIP proxy server 50 (which is identical to the second SIP proxy server 60) includes a network communication unit 500 for connecting with the Internet, a signal transceiver unit 502, an inter-domain registration unit 504, an inter-domain intermediary node searching unit 506, and a domain management database 508. The mobile phone 10 includes a network communication unit 100 for connecting with the Internet, an intermediary node requesting module 102, an authentication communication unit 104, and an inter-domain key-processing unit 106. Operations of these functional units are described below.

The authentication method for inter-domain voice communication of this embodiment includes:

Step (A):

The mobile phone 10 requests the first SIP proxy server 50 to provide an intermediary node device that is simultaneously registered in the first and second domains 55, 65.

Prior to step (A), information of a plurality of candidate intermediary node devices has already been recorded in the first SIP proxy server 50. In a turned-on state, the candidate intermediary node devices transmit domain-specific information to the first SIP proxy server 50 to perform registration and update.

First, the candidate intermediary node devices must be devices that are simultaneously registered in the first and second domains 55, 65. In the preferred embodiment, the intermediary node devices are exemplified as mobile phones, but are not limited in this respect. In a turned-on state, the candidate intermediary node devices transmit domain-specific information to the SIP proxy servers of appropriate domains at fixed intervals to let the SIP proxy servers be aware of their presence, such that a bridge can be established between the two domains 55, 65.

Figure 3:
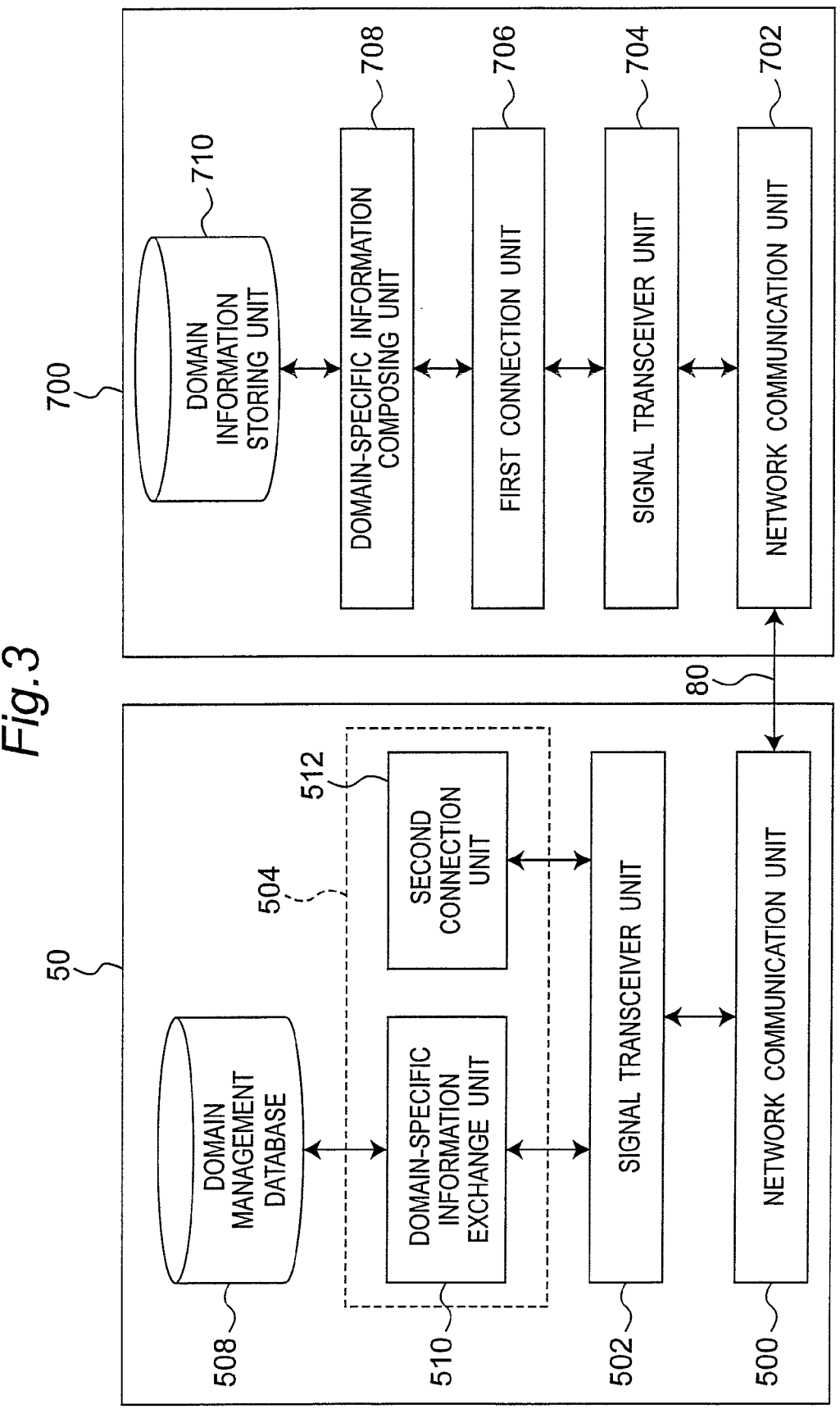
FIG. 3 is a block diagram of internal hardware architecture of the first SIP proxy server (partial) and a candidate intermediary node device according to the preferred embodiment.

Further, in order to generate the domain-specific information, as shown in FIG. 3, each of the candidate intermediary node devices 700 includes a network communication unit 702, a signal transceiver unit 704, a first connection unit 706, a domain-specific information composing unit 708, and a domain information storing unit 710 for storing configuration data.

Also, in order to process the above-mentioned domain-specific information, as shown in FIG. 3, the inter-domain registration unit 504 of the first SIP proxy server 50 (which is identical to the second SIP proxy server 60) further includes a domain-specific information exchange unit 510 and a second connection unit 512.

Figure 4:
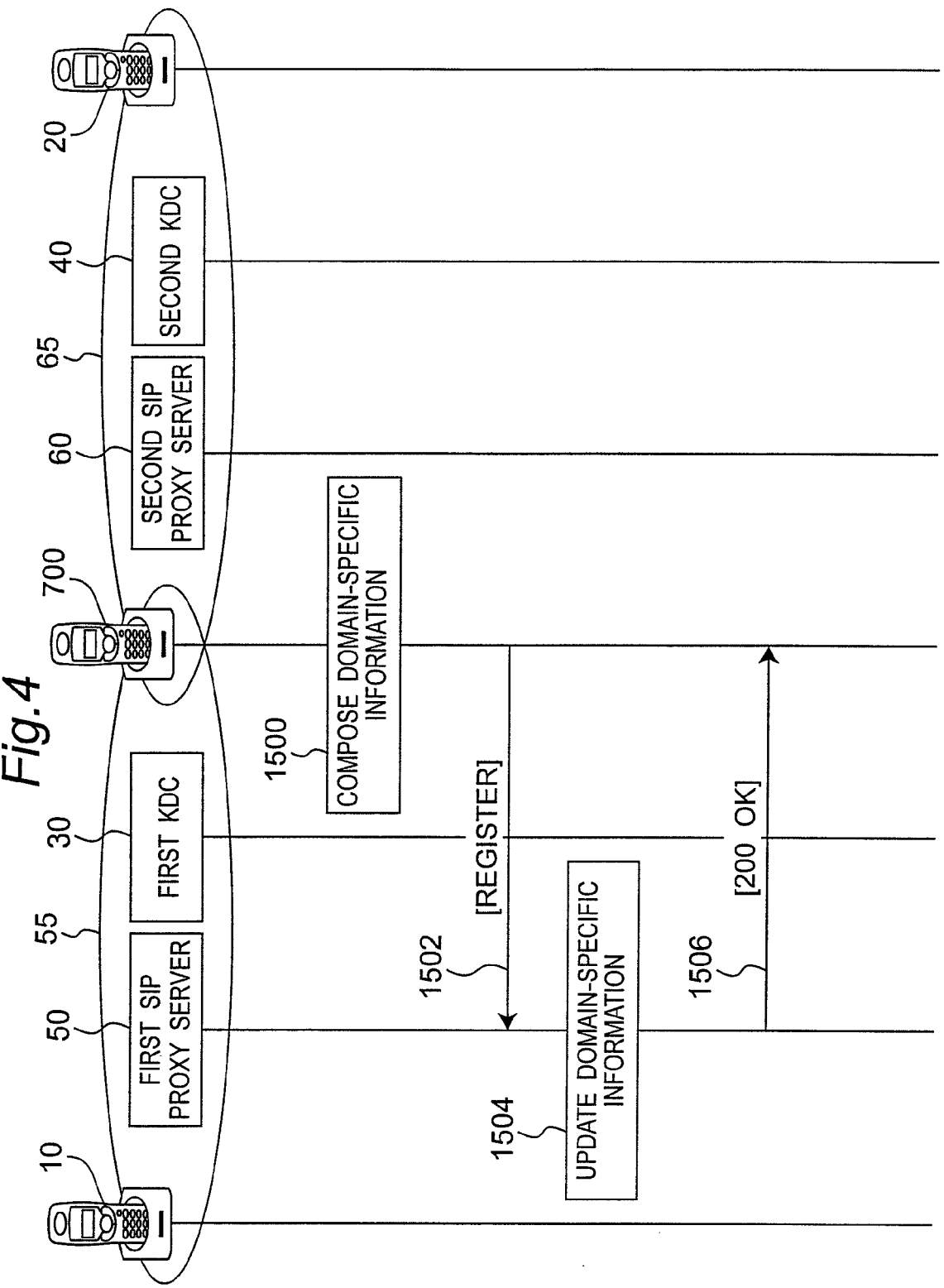
FIG. 4 is a flow chart of registration of the candidate intermediary node device with the first SIP proxy server according to the preferred embodiment.

With additional reference to the flow chart of FIG. 4, in a turned-on state, the candidate intermediary node device 700 instructs, in step 1500 of FIG. 4, the domain-specific information composing unit 708 thereof to compose configuration data stored in the domain information storing unit 710, thereby constructing domain-specific information containing the identities of the first and second SIP domains 55, 65 and the identities of the first and second KDCs 30, 40. Next, in step 1502, in the first connection unit 706, the domain-specific information is attached to a registration request [REGISTER], and sent to the first SIP proxy server 50 through the signal transceiver unit 704 and the network communication unit 702. The domain-specific information further comprises information such as hardware capability of the intermediary node device itself and maximum number of node-to-node connections that can be concurrently processed.

When the first SIP proxy server 50 receives the registration request [REGISTER] through its network communication unit 500 and signal transceiver unit 502, in step 1504, the second connection unit 512 thereof is triggered to analyze and extract domain-specific information from the registration request [REGISTER], and after the domain-specific information exchange unit 510 is triggered to update original data using the domain-specific information, the domain-specific information is stored in the domain management database 508. After the update is completed, in step 1506, a successful completion message [200 OK] is sent to the candidate intermediary node device 700. Thus, the bridge established between the candidate intermediary node devices 700 and the second SIP domain 65 and the second KDC 40 are registered in the first SIP proxy server 50.

Figure 5:
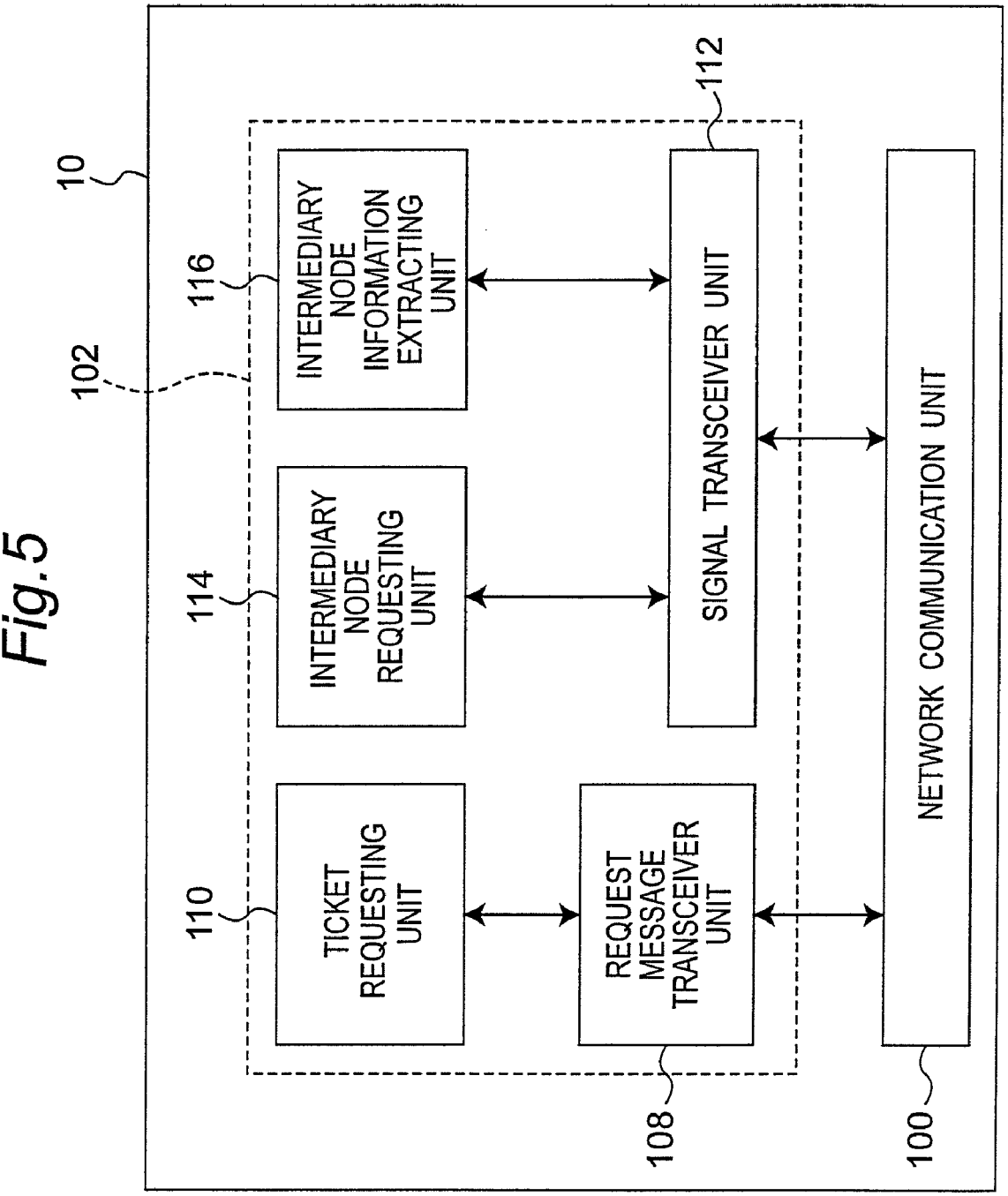
FIG. 5 is a circuit block diagram of detailed hardware architecture of the intermediary node requesting module of the mobile phone according to the preferred embodiment.

Referring to FIG. 5, the intermediary node requesting module 102 of the mobile phone 10 is used to generate a ticket request for communication with the mobile phone 20, and through the network communication unit 100, requests an intermediary node device from the first SIP proxy server 50. The intermediary node requesting module 102 includes a request message transceiver unit 108, a ticket requesting unit 110, a signal transceiver unit 112, an intermediary node requesting unit 114, and an intermediary node information extracting unit 116.

Figure 6:
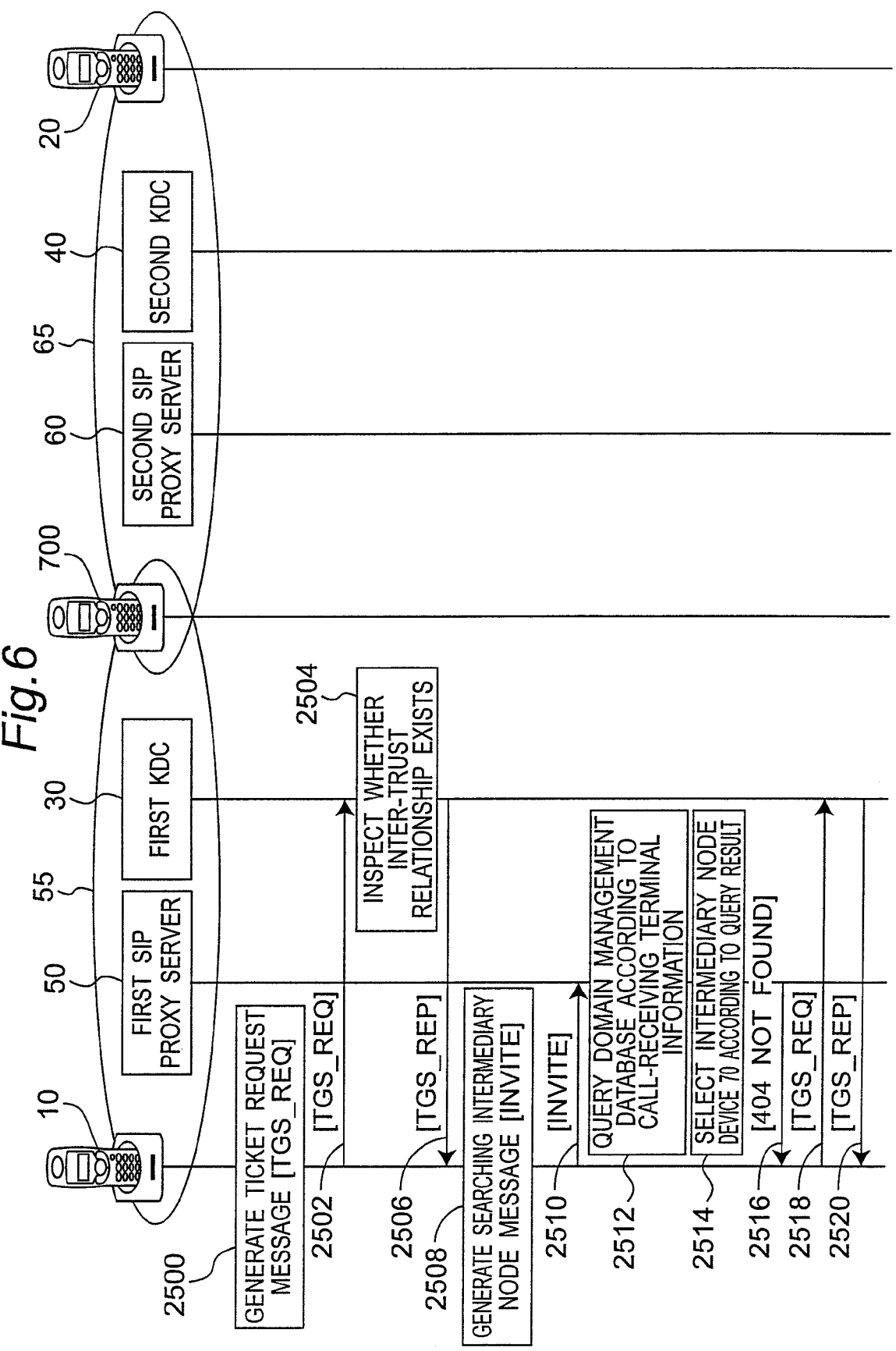
FIG. 6 is a flow chart of searching for an intermediary node device by the first SIP proxy server according to the preferred embodiment.

Therefore, when the mobile phone 10 belonging to the first SIP domain 55 desires to make a call to the mobile phone 20 belonging to the second SIP domain 65, in step 2500 of FIG. 6, the ticket requesting unit 110 generates a ticket request message [TGS_REQ] containing the information of the call-receiving terminal (i.e., the mobile phone 20), for example, Bob@sipb.com. In step 2502, the ticket request message [TGS_REQ] is transmitted to the first KDC 30 through the request message transceiver unit 108 and the network communication unit 100. Then in step 2504, the first KDC 30 inspects the message to determine whether any inter-trust relationship exists between the first SIP domain 55 and the second SIP domain 65, that is, whether a trust relationship has been pre-established between the first KDC 30 and the second KDC 40, for example, a shared key has been pre-established therebetween.

Since the first KDC 30 discovers that an inter-trust relationship with the second KDC 40 is lacking (since they are not in the same domain), in step 2506, the first KDC 30 responds with a response message [TGS_REP] containing a failure (NG) message to the mobile phone 10. When the mobile phone 10 receives the failure response message [TGS_REP] through the network communication unit 100 and the request message transceiver unit 108, the mobile phone 10 will know that the mobile phone 20 belongs to a different domain. Therefore, the mobile phone 10 must search for an intermediary node between itself and the mobile phone 20 belonging to a foreign domain.

Hence, in step 2508, the intermediary node requesting unit 114 of the mobile phone 10 generates a searching intermediary node message [INVITE] containing the information of the call-receiving terminal, for example, the SIP URI: Bob@sipb.com of the mobile phone 20. In step 2510, the searching intermediary node message [INVITE] is transmitted to the first SIP proxy server 50 through the signal transceiver unit 112 and the network communication unit 100 to search for an intermediary node device.

Figure 7:
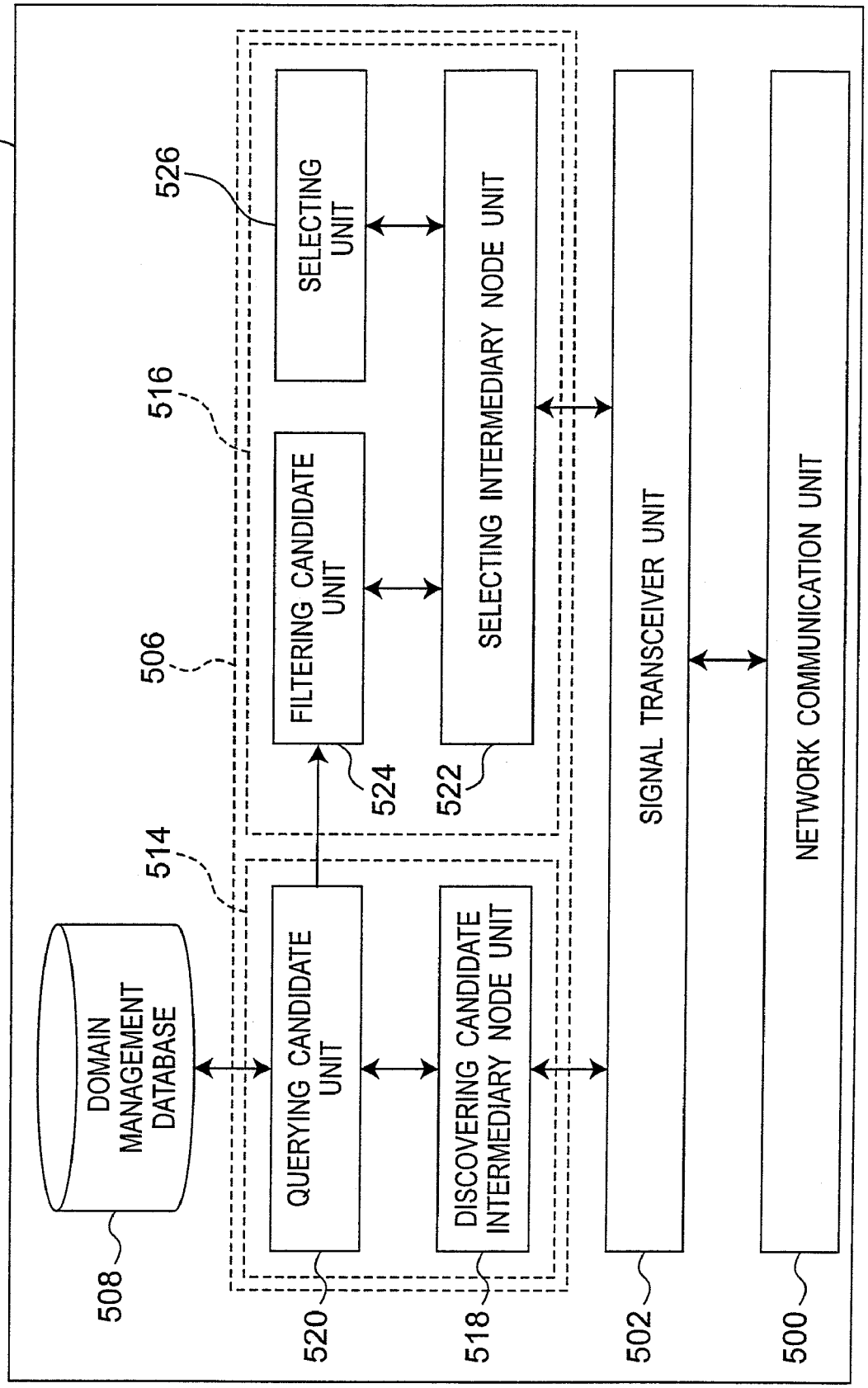
FIG. 7 is a block diagram of partial internal hardware architecture of the first SIP proxy server according to the preferred embodiment.

In order to assist the mobile phone 10 to find a suitable intermediary node device, with reference to FIG. 7, the inter-domain intermediary node searching unit 506 of the first SIP proxy server 50 further includes a discovering intermediary node module 514 for discovering an intermediary node and generating a query result, and a selecting intermediary node module 516 for selecting the best intermediary node device in accordance with the query result. The discovering intermediary node module 514, in turn, comprises a discovering candidate intermediary node unit 518 and a querying candidate unit 520; and the selecting intermediary node module 516, in turn, comprises a selecting intermediary node unit 522, a filtering candidate unit 524, and a selecting unit 526.

Therefore, in step 2512 of FIG. 6, after the first SIP proxy server 50 receives the searching intermediary node message [INVITE] through the network communication unit 500 and the signal transceiver unit 502, the discovering candidate intermediary node unit 518 thereof is triggered to acquire the information of the call-receiving terminal from the searching intermediary node message [INVITE], which is then transmitted to the querying candidate unit 520 and is used as an index (search condition) to search the domain management database 508. In particular, the information of the candidate intermediary node devices 700 recorded in the domain management database 508 is queried to find candidate intermediary node devices that exists simultaneously in the first and second domains 55 and 56, which will be used as an input to subsequent selection of an intermediary node. An example of the query result is shown in FIG. 8. Three candidate intermediary node devices (Carol1@sipa.com, Carol2@sipa.com, and Carol3@sipa.com) that simultaneously exist in the first and second domains 55 and 65 are found through querying the domain management database 508.

Next, in step 2514, using the query result as input, the filtering candidate unit 524 is triggered to execute an initial filtering procedure, such that unqualified intermediary node devices will be filtered out from the query result. For example, any candidate intermediary node device whose number of active services is greater than or equal to a predetermined number is filtered out. In the example of FIG. 8, the intermediary node device, Carol3@sipa.com, that achieves the largest number of active services is filtered out, such that the candidate intermediary node devices as shown in FIG. 9 are left remaining. Subsequently, the result of the initial filtering (shown in FIG. 9) undergoes a selection of intermediary node device procedure carried out by the selecting unit 526, such that the query result is re-arranged by the order of hardware capability of the candidate intermediary node devices, and the best intermediary node device 70 is selected from the remaining candidate intermediary node devices 700 according to which has the best hardware capability or the largest number that can be serviced. Therefore, the intermediary node device Carol2@sipa.com is selected if the condition of "best hardware capability" is used, while the intermediary node device Carol1@sipa.com is selected if the condition of "largest number that can be serviced" is used.

Hence, after the intermediary node device 70 is selected, in step 2516, the first SIP proxy server 50 generates through the selecting intermediary node unit 522 information containing the intermediary node device 70, such as a response message [404 Not Found] containing SIP URI Carol1@sipa.com (or Carol2@sipa.com), which is transmitted to the mobile phone 10 through the signal transceiver unit 502 and the network communication unit 500. The mobile phone 10 receives the response message [404 Not Found] through the network communication unit 100 and the signal transceiver unit 112, and extracts information of the intermediary node device 70 from the response message [404 Not Found] through the intermediary node information extracting unit 116. Thus, the mobile phone 10 has found the intermediary node device 70 that acts as an intermediary node for performing inter-domain secure authentication with the mobile phone 20, and the mobile phone 10 possesses the identification information (Carol1@sipa.com or Carol2@sipa.com) of the intermediary node device 70.

Subsequently, in step 2518, the mobile phone 10 generates and transmits a ticket request message [TGS_REQ] through the ticket request unit 110, the request message transceiver unit 108, and the network communication unit 100 thereof, and requests from the first KDC 30 a ticket for connecting to the intermediary node device 70. After generating a ticket for the intermediary node device 70, in step 2520, the first KDC 30 responds with a ticket reply message [TGS_REP] to the mobile phone 10. Hence, the ticket for the intermediary node device 70 obtained by the mobile phone 10 may be used for subsequent secure authentication with the mobile phone 20.

Step (B):

The mobile phone 10 requests a first session key from the second KDC 40 through the intermediary node device 70, and transmits a first session ticket containing the first session key to the mobile phone 20.

Figure 10:
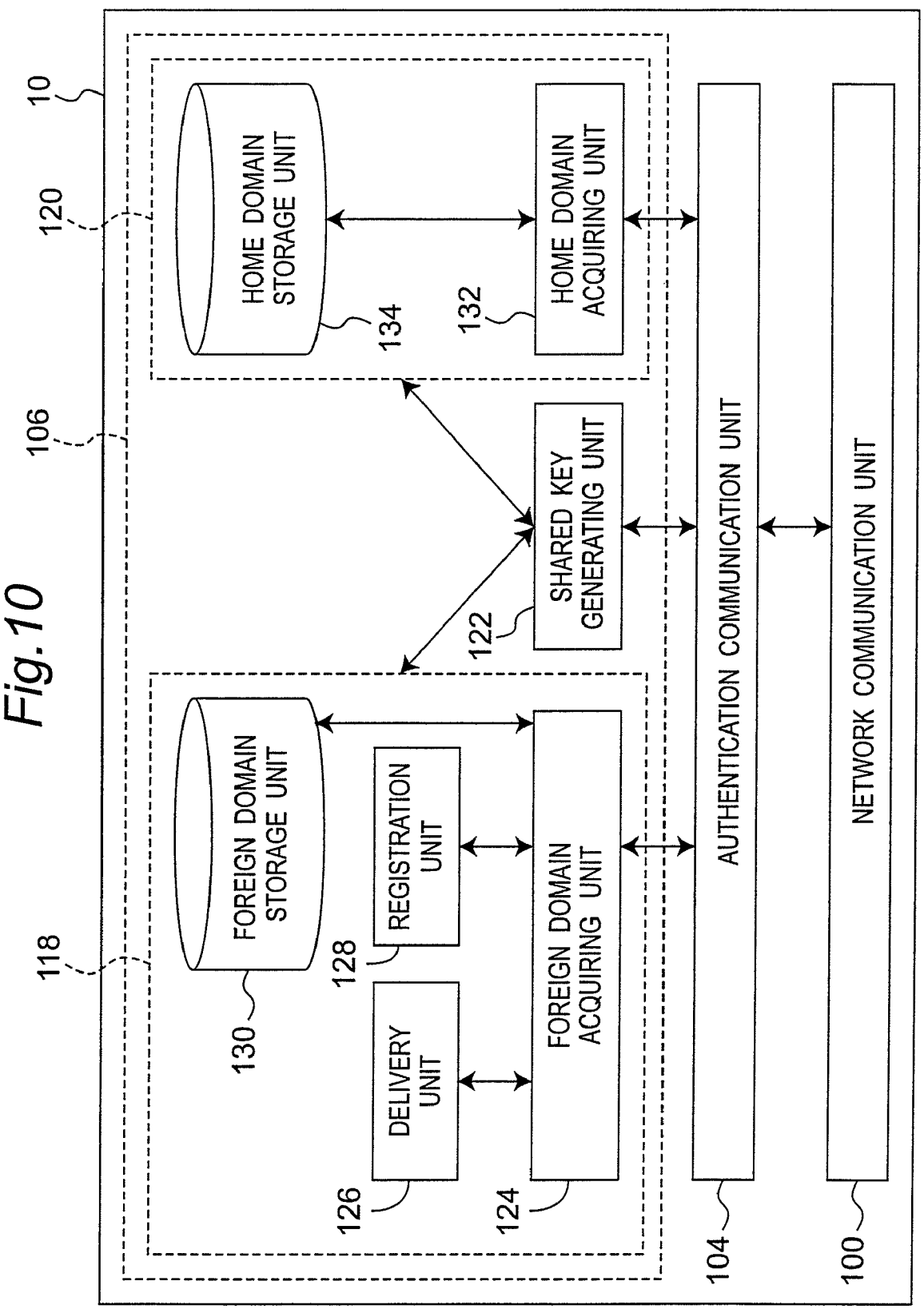
FIG. 10 is a block diagram of detailed hardware architecture of the external domain-processing module and the home domain-processing module of the mobile phone according to the preferred embodiment.

As shown in FIG. 10, in order to realize the above operation, the inter-domain key-processing unit 106 of the mobile phone 10 (likewise for the mobile phone 20) includes a foreign domain-processing module 118, a home domain-processing module 120, and a shared key generating unit 122. The foreign domain-processing module 118, in turn, includes a foreign domain acquiring unit 124, a delivery unit 126, a registration unit 128, and a foreign domain storage unit 130. The home domain-processing module 120, in turn, includes a home domain acquiring unit 132 and a home domain storage unit 134. The foreign domain-processing module 118 and the home domain-processing module 120 are both connected to the Internet via the authentication communication unit 104 and the network communication unit 100.

Figure 11:
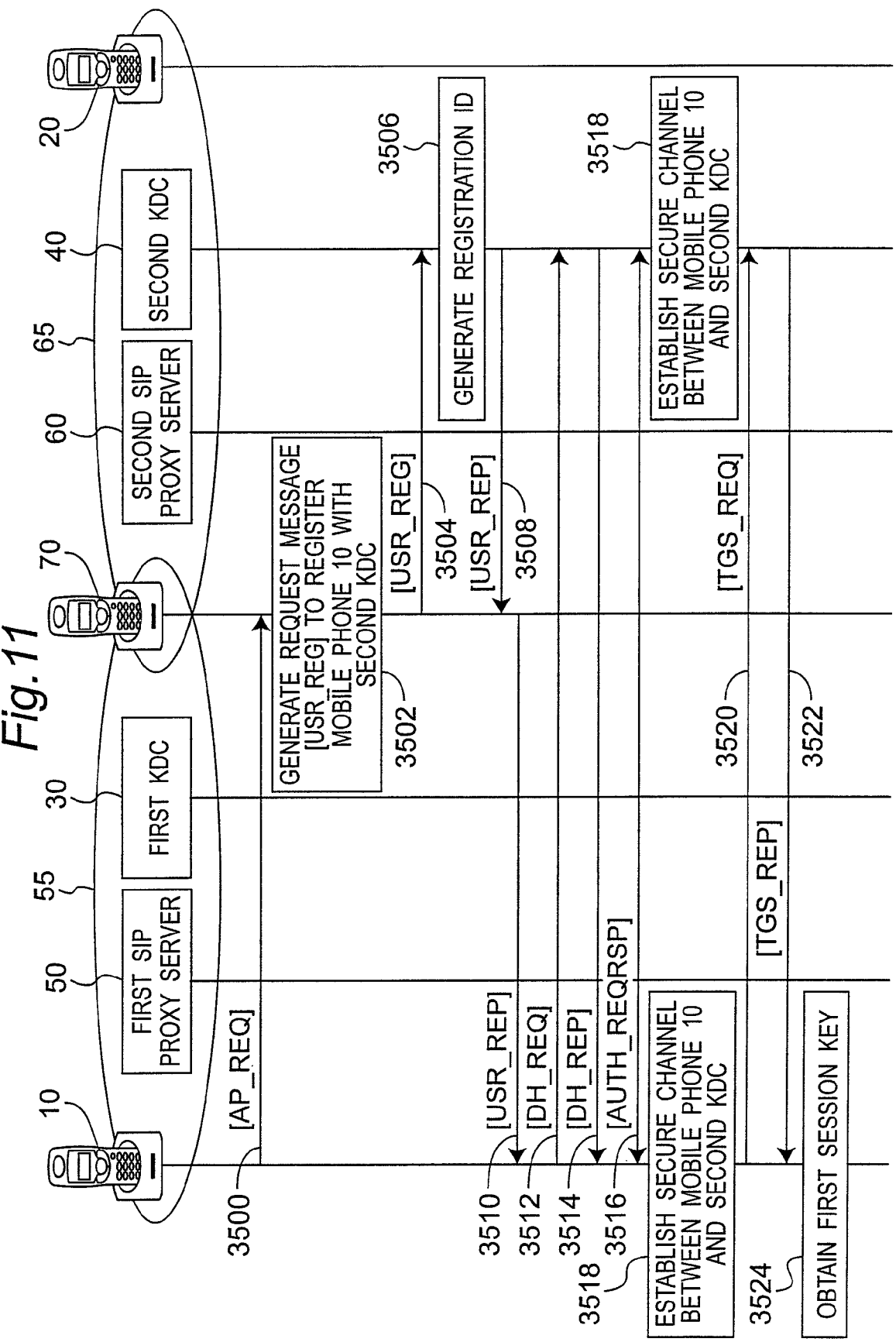
FIG. 11 is a flow chart of requesting a first key from a second KDC by a mobile phone belonging to a first domain through the intermediary node device according to the preferred embodiment.

Therefore, when the mobile phone 10 desires to perform inter-domain authentication with the mobile phone 20 through the intermediary node device 70, first, the mobile phone 10 triggers the foreign domain acquiring unit 124 to register with the second KDC 40 through the intermediary node device 70. In step 3500 of FIG. 11, at the start, a registration request message [AP_REQ] is composed at the registration unit 128, and is sent to the intermediary node device 70 through the authentication communication unit 104 and the network communication unit 100. Next, in steps 3502 and 3504, the intermediary node device 70 re-generates a request message [USR_REG] (to which an identification Alice@sipa.com of the mobile phone 10 is attached) for requesting registration of the mobile phone 10 with the second KDC 40, and transmits the request message to the second KDC 40. After receiving the request message, in step 3506, the second KDC 40 generates a registration ID for the mobile phone 10, and in step 3508, the second KDC 40 responds to the intermediary node device 70 with a registration reply message [USR_REP] to which the registration ID is attached. Next, in step 3510, the intermediary node device 70 transmits the registration reply message [USR_REP] to the mobile phone 10, whose network communication unit 100 and authentication communication unit 104 send the registration reply message [USR_REP] to the registration unit 128.

After receipt of the registration ID generated by the second KDC 40, in steps 3512 and 3514, the mobile phone 10 establishes a secure channel ([DH_REQ] and [DH_REP]) with the second KDC 40 through a secure protocol, such as Diffie-Hellman. Next, in step 3516, the mobile phone 10 performs authentication ([AUTH_REQRSP]) with the second KDC 40 using the registration ID to confirm that the registration ID was transmitted from the second KDC 40. In step 3518, an authenticated and secure channel is established between the mobile phone 10 and the second KDC 40.

Next, in step 3520, the mobile phone 10 instructs the foreign domain acquiring unit 124 to transmit a ticket request message [TGS_REQ] to request from the second KDC 40 a ticket for the mobile phone 20. Therefore, in step 3522, the second KDC 40 responds to the mobile phone 10 with a ticket reply message [TGS_REP] containing a first session key and a first session ticket (which contains the encrypted first session key), where the session ticket is to be transmitted to the mobile phone 20. In step 3524, the foreign domain acquiring unit 124 stores the obtained first session key and first session ticket in the foreign domain storage unit 130.

On the other hand, in step 3528 of FIG. 12, the mobile phone 10 sends a request message [INVITE] containing information of the intermediary node device 70 (Carol1@sipa.com or Carol2@sipa.com) to the mobile phone 20 to trigger the mobile phone 20 to exchange secure credentials. The request message [INVITE] is transmitted to the mobile phone 20 through the first and second SIP proxy servers 50, 60. After receiving the request message [INVITE], in step 3530, the mobile phone 20 transmits to the mobile phone 10 a reply message [200 OK], indicating the start of secure credentials exchange.

Next, in step 3532, the mobile phone 20 transmits a registration request message [AP_REQ] to the intermediary node device 70 for registration with the first KDC 30. After receiving the message, in steps 3534 and 3536, the intermediary node device 70 re-generates a user registration request message [USR_REG] containing an identification Bob@sipb.com of the mobile phone 20, and transmits the same to the first KDC 30. Subsequently, in steps 3538, 3540, and 3542, the first KDC 30 generates a registration ID for the mobile phone 20, and responds with a reply message [USR_REP] to the mobile phone 20 through the intermediary node device 70.

After receiving the registration ID, in steps 3544 and 3546, the mobile phone 20 establishes a secure channel ([DH_REQ] and [DH_REP]) with the first KDC 30 through a secure protocol, such as Diffie-Hellman. In step 3548, the mobile phone 20 performs authentication ([AUTH_REQRSP]) with the first KDC 30 using the registration ID to confirm that the registration ID was transmitted from the first KDC 30. Therefore, in step 3550, an authenticated and secure channel is established between the mobile phone 20 and the first KDC 30.

Next, in step 3552, the mobile phone 20 transmits a ticket request message [TGS_REQ] to request from the first KDC 30 a ticket for the mobile phone 10. Therefore, in step 3554, the first KDC 30 responds with a ticket reply message [TGS_REP] containing a second session key and a second session ticket (which contains the encrypted second key) for the mobile phone 20. In step 3556, the mobile phone 20 obtains the second session key and the second session ticket, and stores the same in its foreign domain storage unit 130, after which, in step 3558, the mobile phone 20 transmits the second session ticket to the mobile phone 10 through the delivery unit 126. Afterwards in step 3559, the delivery unit 126 of the mobile phone 10 is triggered to transmit the previously stored first session ticket to the mobile phone 20.

Therefore, in step 3560 of FIG. 13, when the mobile phone 10 receives the second session ticket, it instructs its home domain acquiring unit 132 to extract the second session key from the second session ticket, and to store the second session key in the home domain storage unit 134. Subsequently, in step 3564 of FIG. 13, the shared key generating unit 122 of the mobile phone 10 is triggered to use a pseudo-random function to generate a shared third session key in accordance with the second session key stored in the home domain storage unit 134 and the first session key stored in the foreign domain storage unit 130, and to store the third session key in the home domain storage unit 134.

Likewise, in step 3562 of FIG. 13, when the mobile phone 20 receives the first session ticket, it instructs its home domain acquiring unit 132 to extract the first session key from the first session ticket, and to store the first session key in the home domain storage unit 134. Subsequently, in step 3566 of FIG. 13, the shared key generating unit 122 of the mobile phone 20 is triggered to use a pseudo-random function to generate a shared third session key in accordance with the first session key stored in the home domain storage unit 134 and the second session key stored in the foreign domain storage unit 130, and to store the third session key in the home domain storage unit 134.

Therefore, it can be ensured that the third session key is a common key known only by the mobile phones 10, 20, and the key cannot be learned by a third party (including the first and second KDCs 30, 40). Hence, the mobile phones 10, 20 belonging respectively to the different domains 55, 65 are able to use the third session key to perform secure inter-domain identification authentication, as indicated in step 3568 of FIG. 13, and conduct an inter-domain voice communication after step 3570.

In addition, it is to be noted that by alleviating the workload of the second KDC 40 (and also of the first KDC 30), in the preferred embodiment, the second KDC 40 is allowed to first transmit the first session ticket, together with the first session key, to the mobile phone 10, after which the first session ticket is transmitted from the mobile phone 10 to the mobile phone 20. However, the present invention is not limited in this respect, and without workload considerations of the second KDC 40 (and of the first KDC 30), the first session ticket may be directly transmitted to the mobile phone 20 from the second KDC 40.

From the aforementioned, in the present invention, an SIP proxy server is used to search for a mobile phone that is simultaneously registered in two domains for use as an intermediary node device, such that mobile phones respectively belonging to different domains may perform inter-domain authentication through the intermediary node device. Hence, not only is it unnecessary to utilize complicated inter-domain trust operations on servers of two domains, subjection to network attacks is also reduced, thereby obtaining the advantage and goal of secure inter-domain voice communication between mobile phones of different domains.

In addition to its application to secure authentication of inter-domain voice communication (as in the above embodiment), the present invention may be applied to: (1) secure inter-domain messaging services, such as SMS (Short Message Service), MMS (Multimedia Messaging Service), SIP Notify, SIP Message, etc.; (2) secure inter-domain video communication or inter-domain multimedia streaming, for example, MPEG4, H.264, etc. Since the manner of practicing secure authentication for similar types of inter-domain information communication is almost the same as the main technical means of the aforementioned embodiment, with only the transmitted information content being different, a description thereof will not be provided herein.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to authentication method, system, and apparatus thereof for inter-domain information communication.

The invention claimed is:

1. An authentication method for inter-domain information communication applied to a first electronic device belonging to a first domain and a second electronic device belonging to a second domain that desire to perform information communication via the Internet, the method comprising:
    requesting, by a processor in the first electronic device, to request a first proxy server in the first domain to find an intermediary node device that is simultaneously registered in the first and second domains;
    registering, by the processor in the first electronic device, through the intermediary node device, with a second key distribution center in the second domain, to obtain a first key, and transmitting, by the processor in the first electronic device, a first ticket containing the first key to the second electronic device;
    receiving, by a processor in the second electronic device, the first ticket, and then, through the intermediary node device, registering, by the processor in the second electronic device, with a first key distribution center in the first domain, to obtain a second key, and transmitting, by the processor in the second electronic device, a second ticket containing the second key to the first electronic device; and
    generating, by the processors in the first and second electronic devices, a shared third key according to the first and second keys so as to perform information communication authentication.

2. The authentication method for inter-domain information communication according to claim 1, wherein, in the requesting, the intermediary node device has registered in advance with the first and second key distribution centers.

3. The authentication method for inter-domain information communication according to claim 1, wherein, prior to the requesting, information of a plurality of candidate intermediary node devices has been stored in advance in the first proxy server, and in a turned-on state, these candidate intermediary node devices transmit domain-specific information to the first proxy server to perform registration and to have the domain-specific information be recorded in the first proxy server.

4. The authentication method for inter-domain information communication according to claim 3, wherein the domain-specific information includes data related to the first and second domains, and at least includes identification data of the first and second domains.

5. The authentication method for inter-domain information communication according to claim 3, wherein the domain-specific information includes data related to a capability of each of the candidate intermediary node devices, and at least includes a hardware capability of and a maximum number of node-to-node connections that can be concurrently processed by each of the candidate intermediary node devices.

6. The authentication method for inter-domain information communication according to claim 5, wherein, in the requesting, the first electronic device sends a request message containing information of the second electronic device to the first proxy server, such that a suitable intermediary node device is found from the candidate intermediary node devices according to the request message and the domain-specific information.

7. The authentication method for inter-domain information communication according to claim 1, wherein, in the generating, the information communication authentication is realized through the first proxy server and a second proxy server in the second domain.

8. The authentication method for inter-domain information communication according to claim 7, wherein the information communication is voice communication.

9. The authentication method for inter-domain information communication according to claim 8, wherein the first and second proxy servers are session initiation protocol servers.

10. An inter-domain information communication authentication system installed in a first domain and used to perform information communication via the Internet with a second electronic device belonging to a second domain, said system comprising:
   a first proxy server configured to record a plurality of candidate intermediary node devices;
   a first electronic device configured to send a request message for requesting said first proxy server to find, from said candidate intermediary node devices, an intermediary node device that is simultaneously registered in the first and second domains, and through said found intermediary node device, to register with a second key distribution center in the second domain, to obtain a first key, and to transmit a first ticket containing the first key to the second electronic device; and
   a first key distribution center configured to provide registration to the second electronic device through said intermediary node device, to obtain a second key, and to transmit a second ticket containing the second key to said first electronic device, such that said first electronic device and the second electronic device generate a shared third key according to the first and second keys, so as to perform information communication authentication.

11. The inter-domain information communication authentication system according to claim 10, wherein each of said candidate intermediary node devices includes a domain-specific information composer, a domain information storage configured to store configuration data, and a first connector, and in a turned-on state, generates domain-specific information through said domain-specific information composer according to the configuration data stored in said domain information storage, and transmits the domain-specific information to said first proxy server through said first connector.

12. The inter-domain information communication authentication system according to claim 11, wherein said first proxy server includes a second connector, a domain-specific information exchanger and a domain management database, said second connector analyzing the domain-specific information, said domain-specific information exchanger performing update of the domain-specific information and storing the domain-specific information in said domain management database.

13. The inter-domain information communication authentication system according to claim 11, wherein each of said candidate intermediary node devices includes a signal transceiver and a network communicator, the domain-specific information being transmitted to said first proxy server through said signal transceiver and said network communicator.

14. The inter-domain information communication authentication system according to claim 11, wherein said first proxy server includes a signal transceiver and a network communicator configured to receive the domain-specific information transmitted from each of said candidate intermediary node devices.

15. The inter-domain information communication authentication system according to claim 11, wherein the domain-specific information includes data related to the first and second domains, and at least includes identification data of the first and second domains.

16. The inter-domain information communication authentication system according to claim 11, wherein the domain-specific information includes data related to a capability of each of said candidate intermediary node devices, and at least includes a hardware capability of and a maximum number of node-to-node connections that can be concurrently processed by each of said candidate intermediary node devices.

17. The inter-domain information communication authentication system according to claim 16, wherein the request message contains destination information, said first proxy server further including a discovering intermediary node processor and a selecting intermediary node processor, said discovering intermediary node processor querying a domain management database according to the destination information of the request message, to discover said candidate intermediary node devices that are registered simultaneously in the first and second domains, and generating a query result, said selecting intermediary node processor filtering said candidate intermediary node devices according to the query result, and selecting a suitable intermediary node device from said candidate intermediary node devices.

18. The inter-domain information communication authentication system according to claim 17, wherein said discovering intermediary node processor includes a discovering candidate intermediary node processor and a querying candidate processor, and said selecting intermediary node processor includes a intermediary node selector, a candidate filter, and a selector;
   said discovering candidate intermediary node processor extracting, from the request message, the destination information and transmitting the destination information to said querying candidate processor for use as an index to query information of said candidate intermediary node devices recorded in said domain management database to obtain a query result;
   said candidate filter filtering out unqualified intermediary node devices according to the query result, said candidate filter being used to exclude said candidate intermediary node devices that have exceeded the maximum number of services;

said selector selecting a best intermediary node device from the remaining candidate intermediary node devices according to the hardware capabilities of the candidate intermediary node devices.

19. The inter-domain information communication authentication system according to claim 18, wherein said discovering candidate intermediary node processor and said intermediary node selector communicate with said first electronic device respectively through said signal transceiver and said network communicator.

20. The inter-domain information communication authentication system according to claim 10, wherein said first electronic device, the second electronic device, and said intermediary node device are mobile communication devices.

21. The inter-domain information communication authentication system according to claim 10, wherein said first electronic device, the second electronic device, and said intermediary node device are mobile phones.

22. The inter-domain information communication authentication system according to claim 10, wherein the information communication authentication is realized through said first proxy server and a second proxy server in the second domain.

23. The inter-domain information communication authentication system according to claim 22, wherein the information communication is voice communication.

24. The inter-domain information communication authentication system according to claim 23, wherein said first and second proxy servers are session initiation protocol servers.

25. A mobile communication electronic device belonging to a first domain and performing information communication with a second electronic device belonging to a second domain through the Internet, said mobile communication electronic device comprising:

an intermediary node requesting processor configured to send a request message that requests a first proxy server in the first domain to find an intermediary node device that is simultaneously registered in the first and second domains; and an inter-domain key-processor configured to register with a second key distribution center in the second domain through the intermediary node device so as to obtain a first key, to transmit a first ticket containing the first key to the second electronic device to request the second electronic device to reply with a second ticket containing a second key, to process the second ticket to obtain the second key, and to generate a third key according to the first and second keys for use in performing information communication authentication with the second electronic device.

26. The mobile communication electronic device according to claim 25, wherein said inter-domain key-processor includes a foreign domain-processor, a home domain-processor, and a shared key generator, said foreign domain-processor registering with the second key distribution center through the intermediary node device to obtain the first key, and transmitting the first ticket containing the first key to the second electronic device to request a reply of the second ticket containing the second key; said home domain-processor receiving and processing the second ticket to obtain the second key; said shared key generator generating the third key according to the first and second keys for use in performing information communication authentication with the second electronic device.

27. The mobile communication electronic device according to claim 26, further comprising a network communicator, said intermediary node requesting processor connecting with the first proxy server through said network communicator.

28. The mobile communication electronic device according to claim 27, further comprising an authentication communicator, said foreign domain-processor and said home domain-processor connecting with the Internet through said authentication communicator and said network communicator.

29. The mobile communication electronic device according to claim 28, wherein said foreign domain-processor includes a register, a foreign domain acquirer, a foreign domain storage and a transmitter, said register generating a registration request message, and registering with the second key distribution center through said authentication communicator and said network communicator, to obtain a registration ID, said foreign domain acquirer obtaining the first key and the first ticket from the second key distribution center according to the registration ID, and storing the first key and the first ticket in said foreign domain storage, said transmitter transmitting the first ticket to the second electronic device through said authentication communicator and said network communicator.

30. The mobile communication electronic device according to claim 27, wherein said intermediary node requesting processor includes a request message transceiver, a ticket requestor, a signal transceiver, an intermediary node requestor and an intermediary node information extractor, said ticket requestor generating a ticket request message containing information of a call-receiving terminal, and transmitting the ticket request message to a first key distribution center in the first domain through said request message transceiver and said network communicator; said intermediary node requestor generating a searching intermediary node message containing the information of the call-receiving terminal, and transmitting the searching intermediary node message to the first proxy server through said signal transceiver and said network communicator to search for an intermediary node device; said intermediary node information extractor obtaining information of the intermediary node device from a reply message of the first proxy server.

31. The mobile communication electronic device according to claim 26, wherein said home domain-processor includes a home domain acquirer and a home domain storage, said home domain acquirer processing the second ticket to extract the second key from the second ticket, and storing the second key in said home domain storage.

32. The mobile communication electronic device according to claim 25, wherein the information communication authentication is realized through the first proxy server and a second proxy server in the second domain.

33. The mobile communication electronic device according to claim 32, wherein the information communication is voice communication.

34. The mobile communication electronic device according to claim 33, wherein the first and second proxy servers are session initiation protocol servers.

35. An intermediary node device capable of spanning a first SIP domain and a second SIP domain, and communicating with a first proxy server, and a first electronic device in the first SIP domain, to assist the first electronic device in performing information communication with a second electronic device belonging to the second SIP domain, the information communication between the first electronic device and second electronic device including performing communication authentication using a first key obtained from a second key distribution center located in the second SIP domain and a second key obtained from a first key distribution center located in the first SIP domain, said intermediary node device comprising:
- a domain information storage device configured to store configuration data;
- a first connector configured to connect to the first proxy server; and
- a domain-specific information composer configured to generate domain-specific information according to the configuration data stored in said domain information storage, and to transmit the domain-specific information to the first proxy server through the first connector,
- wherein the domain-specific information includes identities of the first and second SIP domains and the identities of first and second key distribution centers.

36. The intermediary node device according to claim 35, further comprising a signal transceiver and a network communicator coupled to each other, said first connector being coupled to said signal transceiver, such that the domain-specific information is transmitted to the first proxy server via said signal transceiver unit and said network communicator.

37. The intermediary node device according to claim 35, wherein the domain-specific information includes data related to a capability of the intermediary node device, and at least includes a hardware capability of and a maximum number of node-to-node connections that can be concurrently processed by the intermediary node device.

* * * * *

UNITED STATES PATENT AND TRADEMARK OFFICE
CERTIFICATE OF CORRECTION

PATENT NO. : 8,327,144 B2
APPLICATION NO. : 12/376841
DATED : December 4, 2012
INVENTOR(S) : H. Liu et al.

Page 1 of 1

It is certified that error appears in the above-identified patent and that said Letters Patent is hereby corrected as shown below:

In the Claims, column 10, lines 36-37 (Claim 1, lines 6-7), "to request a first proxy" should read --a first proxy--.

In the Claims, column 13, line 45 (Claim 25, line 33), "so as to obtain" should read --to obtain--.

Signed and Sealed this
Nineteenth Day of March, 2013

Teresa Stanek Rea
*Acting Director of the United States Patent and Trademark Office*